United States Patent [19]

Courty

[11] 3,716,497
[45] Feb. 13, 1973

[54] MANUFACTURE OF CATALYSTS OF THE IRON MOLYBDATE TYPE FOR USE PARTICULARLY IN THE CATALYTIC OXIDATION OF ALCOHOLS TO ALDEHYDES

[75] Inventor: Philippe Courty, Nanterre, France

[73] Assignee: Institut Francais Du Petrole Des Carburants Et Lubrifiants, Rueil Malmaison, France

[22] Filed: Aug. 28, 1970

[21] Appl. No.: 68,000

[30] Foreign Application Priority Data

Sept. 8, 1969 France..................................6930522

[52] U.S. Cl. ..................252/470, 252/443, 252/455, 252/458, 252/462, 252/465, 260/603 HF
[51] Int. Cl..........................B01j 11/22, B01j 11/34
[58] Field of Search..............252/470, 462, 446, 443; 260/603, 606

[56] References Cited

UNITED STATES PATENTS

| 1,913,405 | 6/1933 | Mehag et al. | 252/470 |
| 3,459,807 | 8/1969 | Aglietti et al. | 260/603 |
| 3,194,771 | 7/1965 | Vasseur et al. | 252/470 |
| 3,198,753 | 8/1965 | Traina | 260/603 |
| 3,464,931 | 9/1969 | Aglietti et al. | 252/470 |

FOREIGN PATENTS OR APPLICATIONS

| 1,035,571 | 8/1968 | U.S.S.R. | 252/470 |

Primary Examiner—Daniel E. Wyman
Assistant Examiner—P. E. Konopka
Attorney—Millen, Raptes and White

[57] ABSTRACT

Manufacture of a molybdenum and iron containing catalyst in a four-stage process comprising reacting a solution containing molybdenum in an anionic form with a solution containing iron in a cationic form so as to obtain a precipitate, admixing said precipitate with an ammonium salt $NH_4A$, A being an anion, drying the resulting mixture at 40°–150°C and heating the dried product to 300°–500°C.

14 Claims, No Drawings

MANUFACTURE OF CATALYSTS OF THE IRON MOLYBDATE TYPE FOR USE PARTICULARLY IN THE CATALYTIC OXIDATION OF ALCOHOLS TO ALDEHYDES

This invention relates to the manufacture of catalysts particularly useful for oxidizing alcohols to aldehydes and especially methanol to formaldehyde. These catalysts contain, in the form of oxides, iron, molybdenum and optionally at least one of the following metals as additive: Cr, Mo, W, U, V, Ni, Co, Mn, Sc, Y and those having atomic numbers from 57 to 71 included (rare earths).

According to the present invention the catalysts are obtained by precipitation from aqueous solutions of the reactants involved: the resulting precipitate is mixed up with an ammonium salt, preferably a nitrate; the resulting mass, optionally shaped, is dried and thermally decomposed.

It is known from U.S. Pat. No. 1,913,405 (1933) that combinations of the molybdenum oxides and the iron oxides have a catalytic action in the oxidation of alcohols to aldehydes. These catalysts, commonly called "iron molybdates" (since the main active element in this catalysis is $Fe_2(MoO_4)_3$, ferric molybdate) are obtained in most cases by reacting a ferric salt in solution with a soluble molybdate. The reaction produces a precipitate substantially of the formula $Fe_2O_3$, 3 to 4 $MoO_3$, $xH_2O$, associated to a precipitate of hydrated molybdenum trioxide; the atomic ratio Mo/Fe in the precipitate is not critical and may vary between 1.5 and 4; doping of these precipitates may be performed for example by replacing a minor portion of the soluble ferric salt by one or more salts of one or more of the following metal ions: $Cr^{3+}$, $U O_2^{2+}$, $Ni^{2+} Co^{2+}$, $Mn^{2+}$, $VO^{2+}$, $Sc^{3+}$, $Y^{3+}$ and $Ln^{3+}$ (Ln = metal elements having an atomic number from 57 to 71 included).

It is also possible to replace a minor portion of the soluble molybdenum salt by one or more soluble salts of one or more of the following anions: chromate or bichromate, tungstates (metatungstate or paratungstate), uranate, manganate or permanganate, vanadates and metavanadates.

The precipitate is then settled and washed in order to remove external ions which contaminate it, and, after drying and thermal decomposition, it leads to the above-mentioned catalyst the preparation of which has been described in many patents.

The present invention relates to the manufacture and use of catalysts containing molybdenum, iron and optionally at least one of the above-mentioned metal additives.

Although the present process is similar to those previously described as far as precipitation, decantation and washing of the precipitate are concerned, it differs therefrom by the fact that the precipitate obtained after the washing step is admixed with a solution of an ammonium salt (preferably the nitrate), the ammonium salt being introduced at a concentration higher than 0.9 gram-molecule per gram-atom of iron. The resulting slurry is then dried in the manner described hereinafter and thermally decomposed, thereby providing the new catalyst object of the invention.

The use of such substances has already been mentioned as providing for an increase of the specific surface and of the pore volume of the catalyst. For such uses there are added a few percents of substances capable of disappearing by calcination, leaving at their place pores of a suitable size.

Substances of this type are for example cellulose or ammonium nitrate.

It has been observed, surprisingly, that according to the process of this invention, the addition of substantial amounts, much higher than those used up to now, of ammonium salts, selectively favors the formation of the catalytically active phase while producing the inverse result of that indicated above, since the specific surface of the obtained catalyst is lower than that of the same catalyst when prepared without addition of ammonium salts (see Examples 1, 2, 3, and 4); moreover the obtained catalyst has a lower specific gravity.

The amount of the ammonium salt introduced in the catalyst is determined with respect to the number of gram equivalents of ferric iron involved (1 gram-equivalent of $Fe^{3+}$ = one-third gram-ion of $Fe^{3+}$). There is used an amount of ammonium salt higher than 0.3 mole of salt per gram-equivalent of iron, preferably from 0.5 to 2 moles per gram-equivalent of $Fe^{3+}$.

The iron molybdate precipitate is prepared by reaction between solutions of the used reactants, preferably aqueous solutions. Thus molybdenum is preferably used in the form of ammonium, lithium, sodium or potassium molybdates (for example, molybdate, heptamolybdate, paramolybdate, dodecamolybdate). The solution concentration is preferably lower than 0.5 gram-atoms of Mo per liter, for example from 0.01 to 0.5 gram-atom per liter; its temperature is adjusted to a value preferably higher than 30°C. The metal additives which may be introduced in the molybdenum-containing solution (tungsten, manganese, vanadium, uranium, chromium) are used as ammonium salts or salts of the above-mentioned alkali metals (alkali metal tungstates, ammonium tungstates, ammonium, sodium or potassium manganate or permanganate, alkali metals or ammonium vanadate or metavanadate, ammonium uranate, ammonium, sodium or potassium chromate or bichromate). Uranium may also be introduced in the form of uranyl salts (for example uranyl sulfate, acetate, oxalate formate or nitrate) and the vanadium may also be introduced in the form of vanadyl salts (for example vanadyl sulfate, acetate, oxalate or formate); in the particular case of solutions containing the vanadyl ion it is preferred to treat the same with a variable amount of oxidizing substance such as, for example, hydrogen peroxide in aqueous solution. The total amount of additives M is such that the atomic ratio M/(M+ Mo) is kept lower than 0.5.

The total concentration of the molybdenum containing aqueous solution, after optional introduction of metal additives, must preferably not exceed 0.5 gram atom of metal species as a whole, per liter, its temperature being generally adjusted to a value above 30°C; its pH may be modified by means of various bases such as lithium hydroxide, sodium or potassium hydroxides, ammonia.

It may be also acidified by means of usual inorganic acids as mentioned below.

The metals in a cationic form (iron, cobalt, nickel, manganese, chromium, scandium, yttrium, rare earths from No. 57 to No. 71) are used in the form of solutions, e.g. aqueous solutions with a total concentration preferably adjusted to at most 0.3 (e.g. 0.01 to 0.3) gram-atom of metal species as a whole per liter of solution, the temperature of said solutions being preferably above 30°C, although it is possible to precipitate iron molybdate at a temperature of, for example, from 0° to 150°C, provided the pressure is sufficient for maintaining a liquid phase. All the soluble salts of the above-mentioned metal elements may be used (for example the nitrates, chlorides, acetates formates, bromides, oxalates or sulfates). The resulting solution may be treated, if desired, with an inorganic acid such as one from the group consisting of nitric, sulfuric, formic, acetic, perchloric, hydrochloric, hydrofluoric, phosphoric acids or any other strong acid. In the particular case of iron it is recommended not to make use of ferrous salts, since the latter produce the reduction of the molybdate ions during the subsequent precipitation reaction. The overall amount of metal additives M', thus introduced, is such that the atomic ratio M'/(M' + Fe) is lower than 0.5. After the concentration and the temperature of the two above-mentioned solutions have been adjusted to suitable values, one of these two solutions may be placed in a vessel and stirred vigorously. The other solution is then added thereto. The precipitation is, in some cases, conducted at a constant pH value, by simultaneously adding small amounts of acid or base to the solution contained in the vessel; finally both solutions may be simultaneously added to a third one, either acid, neutral or basic. These conditions are not critical and any other method resulting in a homogeneous and, as far as possible, substantially quantitative precipitation, may also be used.

After reaction, it may be desirable to mature the precipitate in the presence of its mother-liquor, optionally under stirring and/or heating of the resulting suspension.

The precipitate is then separated from its filtrate, and, preferably after washing, is processed according to the method hereunder described which constitutes an essential feature of the invention.

The method of the invention consists of introducing in the precipitate a variable amount of an ammonium salt which can be thermally decomposed.

There can be used so-called "acid" ammonium salts or "neutral" ammonium salts, e.g., the carbonate, the bicarbonate, the fluoride, the chloride, the bromide, the sulfates, the acetate, the chlorate, an oxalate, the formate, the nitrite and preferably the nitrate.

The amount of ammonium salt is determined with respect to the number of gram-equivalents of the metals used in the cationic form; it may vary between 0.3 and 2 moles of ammonium per gram-equivalent of metal.

Generally the ammonium salt is added in the form of an aqueous solution but solutions in an organic solvent may also be used. The solution is admixed with the precipitate and the mixture of these two products is advantageously carried out by malaxing. There can be used for example a mixer, (a roll mixer, a hammer mill, a ball grinder) although it is preferred to make use of a mixer with sigmoid blades, whereby is achieved the maximum physical homogeneity of the mixture resulting in the production of catalysts of a higher mechanical strength.

It may be advantageous to heat the paste, while mixing, to a temperature preferably not in excess of 90°C under normal operating conditions.

More generally this mixing step may be carried out at a temperature between about 0°C and about 150°C but maintained below the boiling temperature of the solvent under the selected pressure.

By evaporation of the water and/or the solvent, the paste viscosity is increased and when its water and/or solvent content reaches for example from 8 to 20 percent by weight it can be extruded or drawn, for example, into cylinders of a diameter between 3 and 6 mm, equal to their height.

The paste may also be poured on a plate and allowed to divide into particles which are thereafter calibrated by screening; the finest particles may be recycled during the step of impregnation with the ammonium salt; it is finally possible to obtain a more complete drying, whereby the water and/or solvent content is reduced to 0.5–5 percent by weight; the resulting product is then adapted to be powdered and shaped into cylinders of the above-mentioned size.

The drying conditions of the precipitate are preferably the following: the dehydration is conducted in a drying oven or any other suitable device, in air or another gas or under vacuum, for at least 6 hours, at a temperature between 40 and 150°C, more particularly between 50° and 90°C.

A variant of the drying process consists of preparing with the precipitate and the aqueous or organic solution of ammonium salt, a suspension to which are optionally added binding agents, dispersing or defloculating agents such as predigested starch, polyglycols, alginic acid and alginates, methylcelluloses, emulsified paraffinic waxes, polyvinyl alcohol, natural gums (e.g arabic gum, Senegal gum, tragacanth gum, lacquer, damar gum or carob-seed gum). The added amount is usually between 1 and 5 percent by weight.

The suspension which, in most cases, contains from 30 to 70 percent of dry substance may then be atomized in a conventional drying atomization device such as those used in the industry of ceramics. The drying cycle is so adjusted that the powder, at the output of the apparatus contains from 0.5 to 5 percent by weight of water and/or solvent. The powder is then shaped into pellets in the above-described manner.

The resulting product after the drying and shaping steps is thermally decomposed at a temperature between 300° and 500°C, more particularly between 350° and 470°C. It is possible to directly supply the precipitate to an oven at a variable temperature, or to effect the calcination stepwise, starting from the dessication temperature of the precipitate, the temperature being then progressively increased up to a value between 350° and 470°C; it is also possible to proceed in a similar way directly in the catalysis reactor where the catalyst will be tested or used. This decomposition may be achieved in any device providing for a sufficient heat exchange.

The thermal decomposition is conducted over a variable time interval according to the type of thermal device used. For example, in a fixed bed oven, this time interval is advantageously lower than 6 hours and more particularly between 1 and 5 hours.

The temperature directly measured in the product during its decomposition will be prevented to exceed 500°C since too high calcination temperatures might be thereafter responsible for catalyst deactivations.

The resulting catalyst is a solid substance, having a yellow-green-to-green color in the absence of additives, this color varying according to the type of additives used and its content thereof. The catalyst mechanical strength is good, its specific surface generally between 0.5 and 20 $m^2g^{-1}$, the best results being achieved with catalysts having a specific surface between 4 and 12 $m^2/g$.

The catalyst may be diluted with a catalytically inert material of a suitably selected grain size. The proportion by volume [catalyst/(catalyst + diluent)] may vary, for example, between 0.1 and 1. The diluent grain size is selected as close as possible to the catalyst grain size.

Commonly used inert diluents have variable shapes (balls, cylinders, rings and the like). They comprise for example ceramics or alumina, silica, silico-aluminates, glasses or silicon carbide.

The diluent particles may be either admixed with the catalyst particles or form one or more beds above, below or interposed within the catalyst bed, more generally they precede or follow the catalyst bed or are interposed therein.

The diluents, conveniently placed with respect to the catalyst bed, provide for an improved heat exchange in the latter. Moreover they reduce the abrasion or attrition phenomena in the catalyst bed and reduce the pressure drop therethrough.

The oxidation of methanol to formaldehyde may be effected by passing a vaporized mixture of methanol and molecular oxygen-containing gas through the catalyst bed at a pressure which can be varied but is preferably close to the atmospheric pressure, the catalyst bed being preheated to a temperature between 250° and 450°C, preferably between 300° and 400°C.

Oxygen may be diluted with nitrogen or any other inert gas. Another gas such as steam or carbon dioxide may also be present. The proportions of inert gas and oxygen are different and their selection mainly depends on the conditions of explosion of the mixture with the vaporized methanol. Air is advantageously used as nitrogen-oxygen mixture.

The proportions commonly used for the air-methanol gaseous mixture vary between 3 and 15 percent, more particularly between 5 and 7 percent by volume of methanol in the air; the methanol-air mixture passes through the catalyst bed at an hourly volume rate, expressed in liters of gaseous mixture, under normal pressure and temperature conditions, per liter of catalyst and per hour, which is advantageously from 3,600 $h^{-1}$ to 72,000 $h^{-1}$, preferably between 24,000 $h^{-1}$ and 36,000 $h^{-1}$.

The following examples are given for illustrative purpose and must be not considered in any way as limiting the scope of the invention. In these examples, Examples 1, 3, 5, and 6 are given by way of comparison and form no part of the invention.

EXAMPLE 1

A catalyst is prepared according to an already known method. There are prepared two solutions A and B as follows:

Solution A: 210 g (1.19 moles $MoO_3$) of tetrahydrated ammonium paramolybdate are dissolved in 5 liters of distilled water and the pH of the solution is adjusted to 5 by use of nitric acid.

Solution B: 149 g (0.37 mole $Fe^{3+}$) of nonahydrated ferric nitrate are dissolved in 5 liters of distilled water and the pH is adjusted by the use of nitric acid.

Both solutions are heated to 90°C and solution A is slowly added to solution B under vigorous stirring while controlling the pH value which must not exceed 1.5.

The precipitate, which has been allowed to rest over one night, is settled and filtered over a filter, then washed again by decantation and filtered. The filtration cake is divided in two equal portions I and II. Portion I is dried for 2 days at 22°C and 2 days at 50°C and thereafter crushed to fragments of 1 to 2 mm. These fragments are dried for 2 days at 50°C and 3 days at 100°C. Fraction I is then activated under the reaction conditions, for 3 hours at 420°C. There is thus obtained a catalyst whose specific surface, measured by the BET method, is 21.4 $m^2.g^{-1}$; its grain density is $d = 1.50$ six ml of this portion are placed in a catalysis reactor and the temperature of the catalyst bed is raised to 350°C. There is passed over the catalyst a gaseous mixture containing 6.5 percent by volume of methanol in air, at a hourly volume rate V.V.H of 24,000 $h^{-1}$ as determined on gaseous volumes at 20°C. The reaction temperature, measured at four points of the catalyst bed, varies between 335° and 434°C and the experiment is continued for 6 hours.

The material balance at the end of the experiment shows a 99.3 percent methanol conversion, a formaldehyde selectivity of 91.6 percent with respect to the converted products, which corresponds to a total yield of 91 percent with respect to the supplied methanol.

EXAMPLE 2

The portion II of the filtration cake of catalyst as prepared according to example 1 is processed according to the method of the invention.

Accordingly this portion of the filtration cake, which contains 0.20 ion-gram of $Fe^{3+}$ substantially in the form of complex is malaxed with 0.6 mole of ammonium nitrate (48 g) dissolved in 30 ml of water; the resulting slurry is mechanically triturated while maintained at a temperature of about 60°C, until it recovers the consistency of the product before processing. The resulting product is then dried, like portion I, for 2 days at 22°C and then two days at 50°C; the cake is divided into particles of a size between 1 and 2 mm and dried for 2 days at 65°C; the product is finally thermally decomposed, like fraction I, during three hours at 420°C. Ammonium nitrate is removed in the form of volatile nitrogen compounds. There is obtained a catalyst with a specific surface of 5.6 $m^2.g^{-1}$ and a grain density of only 1.25.

Six ml of this catalyst are placed in a catalysis reactor, the catalyst bed being heated to 350°C. There is passed over the catalyst a gaseous mixture containing 6.5 percent by volume of methanol in air, at an hourly volume rate V.V.H. = 24,000 $h^{-1}$.

The reaction temperature, measured at four points of the catalyst bed varies between 371° and 439°C and the experiment is continued for 6 hours.

The material balance at the end of the experiment shows a methanol conversion rate of 99.5 percent, a formaldehyde selectivity of 94.3 percent with respect to the converted products and consequently a formaldehyde yield of 93.8 percent with respect to the methanol feed.

EXAMPLE 3

A catalyst is prepared according to an already described similar method.

In 4 liters of water are dissolved 200 g of tetrahydrated ammonium paramolybdate (1.13 mole of $M_oO_3$), the pH of the solution (solution A) being adjusted to a value between 4.5 and 5 and the solution heated to 60° C.

Separately 164 g of ferric iron nitrate (0.405 ion-gram of $Fe^{3+}$) are dissolved in 2,200 ml of water, the pH of the solution being adjusted to a value between 1 and 1.5 and the solution (solution B) kept at the ambient temperature.

Solution B is added to solution A under vigorous stirring; after decantation of the precipitate, the supernatant liquid is siphoned off, then the precipitate is washed with 3 liters of water, four times, and filtered under a pressure of 200 mm Hg.

The resulting cake is divided into two equal portions I and II.

Portion I is mechanically triturated and the dried for 6 hours at 30°C, 12 hours at 40°C and 6 hours at 60°C. It is then crushed to gramins of a size between 1 and 2 mm and dried for 6 hours at 120°C.

The thermal activation is performed in a muffle in an air stream, the product being supplied as a thin film (5 to 6 cm). The calcination takes 10 hours comprising 2 hours at 150°C, 1 hour at each of the temperatures 200°, 250° and 300°C and finally 5 hours at 420°C.

The resulting catalyst exhibits a specific surface of 12.0 m² g⁻¹ as measured by B.E.T. method and its grain density is 1.37.

6 ml of this catalyst are placed in a catalysis reactor whose catalyst bed is preheated to 350°C. A gaseous mixture of 6.6 percent by volume of methanol in air is passed, at an hourly volume rate (V.V.H.) 20°C of 24,000 h⁻¹, over the catalyst, the reaction temperature varying between 300° and 380°C, the experiment being continued for 6 hours.

The material balance at the end of the experiment shows a 98.5 percent conversion of methanol with a 95.2 percent selectivity to formaldehyde with respect to the converted methanol, i.e., a total yield of 93.9 percent with respect to the supplied methanol.

EXAMPLE 4

The portion II of the filtration cake of the catalyst prepared as in Example 3 is processed according to the method of the invention.

The portion II of the precipitate, which contains 0.21 ion-gram of $Fe^{3+}$ substantially in a complex form, is mixed up with 0.8 mole of ammonium nitrate (64 g) preliminarily dissolved in 40 ml of water, so as to obtain a fluid paste which is dried under stirring at 60°C, giving finally a product having the same consistency as portion I. The resulting substance is then mechanically triturated and then dried for 6 hours at 30°C, 12 hours at 40°C and 6 hours at 60°C. It is then divided into grains of a size between 1 and 2 mm and thereafter dried for 24 hours at 65° C.

The product placed as a thin layer (5 to 6 cm) in a muffle is thermally activated under an air stream. In contrast with the method of Example 3 the thermal decomposition of the catalyst is performed in two hours at 400°–420°C, the ammonium nitrate being removed as volatile nitrogen compound.

There is obtained a catalyst whose specific surface is only 6.5 m².g⁻¹ having a grain density of 1.

Six ml of the catalyst of portion II thus prepared are catalytically tested in the above described conditions: preheating of the bed to 315°C, methanol content of the air of 6.6 %, (VVH) (20°C) = 24,000 h⁻¹, reaction temperature of 310°–380°C, duration of the test: 6 hours.

The material balance shows that 99 % of the methanol have been converted with a selectivity to formaldehyde of 97.0 percent, the total formaldehyde yield being consequently 96 percent with respect to the supplied methanol.

EXAMPLE 5

The preparation is similar to that of Example 3. The filtration cake, which contains 0.405 ion-gramm of $Fe^{3+}$ and would correspond substantially to 195 g of anhydrous catalyst if the precipitation was quantitative, is mixed up with 10 g of ammonium nitrate in an aqueous saturated solution thereof, is then dried and thermally decomposed in the conditions described in Example 4.

The resulting catalyst exhibits a specific surface of 16.1 m2.g⁻¹ as measured according to the B.E.T. method, its grain density being 1.39.

Six ml of this catalyst, placed in a catalysis reactor, are tested in the conditions of Examples 3 and 4, the reaction temperature being between 310° and 383°C.

The material balance at the end of the test shows that 98.4 percent of the methanol have been converted, the selectivity to formaldehyde being 95.3 percent. Accordingly the total formaldehyde yield, with respect to the supplied methanol, amounts to 93.8 percent, i.e., is substantially identical to that of Example 3.

This example shows that although the addition of small amounts (5 percent) of ammonium nitrate increases the specific surface of the catalysts, their efficiency is however not improved; on the contrary, the addition of greater amounts (65 percent in Example 4) results, while decreasing the specific surface of the catalyst, in an increase of its performance, as well its activity as its selectivity.

EXAMPLE 6

A catalyst in which molybdenum and iron are partially substituted, respectively with tungsten and cobalt is obtained as follows:

The molybdenum-containing solution (solution A) is formed of 238.41 g (1.35 mole of $MoO_3$) of tetrahydrated ammonium paramolybdate and 37.79 g (0.15 mole of $WO_3$) of ammonium metatungstate with 92.05 percent by weight of tungstic anhydride, dissolved in 4,500 ml of water. The ph of the solution is adjusted to a value between 5 and 5.5.

The iron containing solution (solution B) is composed of 94.6 g (0.35 mole) of nonahydrated ferric iron chloride and 35.69 g (0.15 mole) of hexahydrated cobalt chloride, dissolved in 1800 ml of water. The solution pH is adjusted to a value between 1 and 1.5.

Solution B is quickly added, under vigorous stirring, to solution A. After decantation of the precipitate the supernatant liquid is siphoned off and the precipitate taken again with 5,000 ml of water and stirred.

This operation is renewed up to complete disappearance of Cl⁻ ions in the washing water.

The precipitate is then divided into three substantially equal portions I, II, and III. It contains the four above-mentioned elements in the following atomic proportions:

$$Co/(Fe+Co)=0.30 \quad W/(Mo+W)=0.10$$
$$Fe+Co/(Mo+W)=2.1 \text{ to } 2.5$$

Fraction I of the precipitate is mechanically triturated until there is obtained a residual moisture content of 30 percent; it is then extruded to cylinders of a diameter and a length of 5 mm.

These cylinders are heated for 12 hours at 120°C and then thermally decomposed in an air stream for 5 hours at 420°C.

Six ml of the resulting catalyst, placed in a catalysis reactor, are processed by a gaseous mixture of 6.6 percent by volume of methanol in air, at a hourly volume rate (V.V.H.$_{20°C}$) of 24,000 h⁻¹. The reaction temperature varies between 380 and 436°C and the test is continued for 6 hours. The material balance at the end of the test shows that 99.1 percent of the methanol have been converted, with a selectivity to formaldehyde of 92.5 percent. Consequently the total formaldehyde yield amounts to 91.7 percent.

EXAMPLE 7

Portion II of the precipitate as prepared according to Example 6, which contains, in a complex form, about 0.17 gram atom of (Fe + Co), is mixed up with a solution of 0.80 mole of ammonium acetate (61.6 g) in ethanol. The resulting slurry is dried at 60°C under mechanical trituration until achievement of a residual water-alcohol content of 30 percent. It is then extruded to cylinders as herebefore and then dried for 24 hours at 60°C.

The thermal activation is conducted in a muffle, under an air stream, the product being laid in thin layer. The decomposition temperature starting at 350°C is then increased to 420°C in 30 minutes and maintained for 3 hours at said level.

Six ml of the resulting catalyst are tested in the conditions of Example 6. The reaction temperature varies between 385°C and 440°C. The material balance shows that 99 percent of the methanol have been converted, the selectivity to formaldehyde being 94.1 percent. Therefore the total formaldehyde yield is 93.1 percent.

EXAMPLE 8

Portion III of the precipitate is processed in the same manner as in Example 7, except for the use of 0.80 mole of ammonium nitrate in aqueous solution (64 g of nitrate, 60 ml of water).

The drying, extruding, thermal decomposition and catalytic test conditions are unchanged.

For a reaction temperature between 387° and 435°C, the material balance shows that 99.3 percent of the methanol have been converted with a selectivity to formaldehyde of 96.1 percent. Consequently the total formaldehyde yield is 95.4 percent.

Examples 7 and 8 show that, although the ammonium salts have an improving effect on the catalytic properties of the so-prepared iron molybdate catalysts, the action of ammonium nitrate is the most remarkable.

From the foregoing description, one skilled in the art can easily ascertain the essential characteristics of this invention and, without departing from the spirit and scope thereof, can make various changes and modifications of the invention to adapt it to various usages and conditions. Consequently such changes and modifications are properly, equitably and intended to be within the full range of equivalence of the following claims.

What I claim is:

1. A process for manufacturing a catalyst consisting essentially of molybdenum and iron in the form of oxides and having an Mo/Fe atomic ratio of about 1.5:1 to 4:1, respectively, comprising the steps of reacting a solution of a molybdenum salt containing molybdenum in an anionic form with a solution of an iron salt containing iron in the form of a ferric cation so as to obtain a precipitate of ferric molybdate; separating the precipitate from the solution; admixing said precipitate with a thermally decomposable acid or neutral ammonium salt of the formula NH$_4$A wherein A is an anion, in an amount of more than 0.3 gram-mole of ammonium salt per gram - equivalent of ferric ion; drying the resultant mixture containing said amount of said ammonium salt at a temperature between 40° and 150°C and, in a fourth stage, heating the resultant dried mixture containing said amount of said ammonium salt to a temperature between 300° and 500°C to thermally decompose same and form said catalyst, whereby said catalyst has a lower specific surface and specific gravity than the same catalyst produced under the same conditions but without the admixture of said ammonium salt.

2. A process according to claim 1 wherein the ammonium salt is ammonium nitrate.

3. A process according to claim 1 wherein the solution of molybdenum salt, has a molybdenum concentration of 0.01 to 0.5 gram-atom per liter and the solution of ferric salt has an iron concentration of 0.01 to 0.3 gram-atom per liter.

4. A process according to claim 1 wherein at least one compound of at least one element, M, selected from the group consisting of Cr, W, Mn, V, and U is dissolved in the molybdenum salt-containing solution prior to the precipitation step, the atomic proportion of M in said solution, M/(Mo + M) being less than 0.5.

5. A process according to claim 1 wherein at least one compound of at least one element, M', selected from the group consisting of Co, Ni, Mn, Cr, Sc, Y and the rare earth metals having an atomic number from 57 to 71 included, is dissolved in the ferric salt-containing solution prior to the precipitation step, the atomic proportion of M' in said solution, M'/(Mo+M') being less than 0.5.

6. A process according to claim 1 wherein the amount of ammonium salt is between 0.5 and 2 gram-moles per gram-equivalent of ferric iron.

7. A process according to claim 1 where the ammonium salt is admixed in the form of an aqueous solution.

8. A process according to claim 1 wherein the precipitate is dried at a temperature between 50° and 90°C.

9. A process according to claim 1 further comprising a step of shaping the precipitate before drying, by atomization and pressing.

10. Catalysts as obtained by the process of claim 1.

11. A process as defined by claim 1 wherein said molybdenum salt is an ammonium, sodium, lithium or potassium molybdate.

12. A process as defined by claim 1 wherein the ammonium salt is admixed in the form of an organic solution.

13. A process according to claim 1 further comprising a step of shaping the precipitate during the drying stage by extrusion.

14. A process according to claim 1, further comprising a step of shaping the precipitate after the drying stage by crushing and pilling.

* * * * *